United States Patent [19]

Shinozaki et al.

[11] 4,282,534
[45] Aug. 4, 1981

[54] THERMAL RECORDING ELEMENTS

[75] Inventors: Fumiaki Shinozaki; Tomizo Namiki; Masao Kitajima; Tomoaki Ikeda; Yuzo Mizobuchi, all of Asaka, Japan

[73] Assignee: Fuji Photo Film Co., Ltd., Minami-ashigara, Japan

[21] Appl. No.: 52,511

[22] Filed: Jun. 26, 1979

[30] Foreign Application Priority Data

Jun. 26, 1978 [JP] Japan .................................. 53/77268

[51] Int. Cl.³ .......................... G01D 15/34; B32B 3/00
[52] U.S. Cl. .................................. 346/135.1; 428/913; 430/200; 430/348
[58] Field of Search ..................... 346/135.1; 430/200, 430/348

[56] References Cited

U.S. PATENT DOCUMENTS

| 3,911,444 | 10/1975 | Lou et al. ..................... 346/135.1 X |
| 3,983,564 | 9/1976 | Nakazawa et al. ........... 346/135.1 X |
| 3,984,583 | 10/1976 | Hermans et al. ............. 346/135.1 X |
| 3,988,501 | 10/1976 | Knirsch et al. ............... 346/135.1 X |
| 4,067,780 | 1/1978 | Fujiwara et al. ............. 346/135.1 X |
| 4,069,487 | 1/1978 | Kasai et al. ................... 346/135.1 X |
| 4,101,907 | 7/1978 | Bell et al. .......................... 346/135.1 |

Primary Examiner—George H. Miller, Jr.
Attorney, Agent, or Firm—Sughrue, Rothwell, Mion, Zinn and Macpeak

[57] ABSTRACT

A thermal recording element comprising a support having formed thereon a recording layer, a first protective layer of a halogenated polyolefin, polystyrene, polystyrene derivative, halogenated rubber or styrene-vinyltoluene copolymer formed on the recording layer; and a second protective layer of a polymer having strong film strength formed on the first protective layer.

14 Claims, 1 Drawing Figure

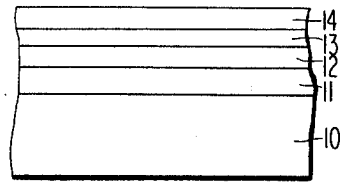

THERMAL RECORDING ELEMENTS

BACKGROUND OF THE INVENTION

1. Field of the Invention

This invention relates to a thermal recording element for recording information by thermally deforming the recording layer thereof by exposure to high intensity radiation and more particularly it relates to a thermal recording element having protective layers formed for increasing the sensitivity of the recording layer.

2. Description of the Prior Art

As recording elements for recording information by exposing to high intensity radiation such as a laser beam, etc., there is the following thermal recording element in addition to light-sensitive elements using silver salts, etc. That is, in the thermal recording element, the recording layer has a high optical density and produces a local temperature increase by absorbing high intensity irradiation, whereby the irradiated portions are removed by thermal deformation such as fusion, evaporation, aggregation, etc., to record information as the difference in optical density between the irradiated portions and non-irradiated portions. Such a thermal recording element has the advantage that processing such as developing, fixing, etc., are unnecessary; a dark room is unnecessary for recording since the element is not sensitive to ordinary room light, high contrast images are obtained, and additional recording (add on) of information is possible.

Recording on such a thermal recording element is generally performed by converting a recording information to an electric time-succession signal and scanning the recording element with a laser beam the intensity of which is modulated according to the electric signal. In this case, there is the advantage that the recorded image is obtained in real time.

As the recording layer for such a thermal recording element, metals, dyes, plastics, etc., are suitably used and, in general, an inexpensive material can be used. Such recording elements are described in, for example, M. L. Levene, *Electron, Ion and Laser Beam Technology* (records of the 11th Symposium held in 1969); *Electronics*, p. 50, Mar. 18, 1968; D. Maydan, *The Bell System Technical Journal*, Vol. 50, 1761 (1971); C. O. Carlson, *Science*, Vol. 154, 1550 (1966), etc. Some of these recording elements have metal recording layers. For example, such a recording element comprises a support having formed thereon a thin layer of a metal such as Bi, Sn, In, etc., and has excellent properties as a thermal recording element since an image of high resolving power and high contrast can be recorded thereon.

However, the recording element containing a metal thin layer shows generally light reflectance of higher than 50% to laser light used for recording, which makes it impossible to effectively utilize the energy of the laser light. Hence the power of the laser beam used for recording must be higher, which requires a laser source of high output capable of recording at high scanning speeds, and thus the recording apparatus used becomes larger and expensive.

Therefore, various recording elements having high recording sensitivity have been studied and a recording element of three layer structure composed of Se, Bi and Ge is disclosed in Japanese Patent Publication No. 40479/71. In this element to reduce the light reflectance of a thin layer composed of Se and Bi, a thin layer of Ge is formed on the layer of Se and Bi. However, the use of Se, etc., is undesirable since there is a possibility of a toxicity problem and the images recorded are not satisfactory.

As another example of a recording element having a reflection preventing layer, a recording element having on a metal layer a reflection preventing layer having light absorption in the wavelength region of the laser beam used for recording is disclosed in Japanese Patent Application (OPI) No. 74632/76 (The term "OPI" as used herein refers to a "published unexamined Japanese patent application"). However, even with a reflection preventing layer, it is very difficult to completely eliminate the occurrence of light reflection and if the occurrence of light reflection can be completely eliminated, a laser light source of high power is required to accomplish thermal deformation such as fusion, evaporation, aggregation, etc., of the metal thin layer and a recording element having higher sensitivity is desired.

Since the recording layer, e.g., a thin metal layer of the thermal recording element as mentioned above is liable to scratch, a protective layer is formed on the metal layer of the recording element to improve the durability, mechanical strength, time stability, etc., of recording element. The protective layer must transmit the light beam of high energy density used for recording, it must have high mechanical strength, it must be slow to react with the recording layer, exhibit good coating property, etc.

As materials for the protective layer, inorganic materials and organic materials have been used. As the inorganic materials, there are transparent materials such as $Al_2O_3$, $SiO_2$, $SiO$, $MgO$, $ZnO$, $MgF_2$, $CuF_2$, etc. The use of inorganic materials as the protective layers is an excellent practice and is disclosed in, for example, Japanese Patent Application (OPI) Nos. 96716/74, 59626/76, 75523/76, 88024/76 and 134633/76. However, the recording elements having protective layers described in the above specifications suffer the disadvantages that the recording sensitivity is greatly reduced as compared with that of a recording element having no protective layer.

When a protective layer composed of an organic high molecular weight material is used, in order to impart sufficient mechanical strength to the recording element the thickness of the protective layer generally must be at least 3 μm and, in this case, a recording energy of 2 to 3 times that in the case of no protective layer is required. If the thickness of the protective layer is thinner than above, in particular, is thinner than 1 μm, the reduction in sensitivity becomes less but the mechanical strength of the recording element is reduced too much to make the recording element suitable for practical use.

Thus, in the case of using the protective layer composed of an organic high molecular weight material or a polymer, it is most important to limit the reduction in recording sensitivity as much as possible while maintaining the strength of the protective layer at a level adequate for practical use.

It can generally be said that when the protective layer having good adhesive property to a recording layer, good film-forming property, a high softening point and a thick thickness is used, the reduction in sensitivity is great but the mechanical strength of the protective layer becomes sufficiently high, while, on the other hand, when the protective layer composed of a polymer having poor adhesive property to a recording layer, poor film-forming property, a low softening point, and a thin thickness is used, the reduction in sensitivity is comparatively less but the mechanical strength of the protective layer is insufficient. As is clear from the above description, the formation of a protective layer capable of protecting the recording layer and giving less reduction in recording sensivity lies in balancing conflicting properties, for example, the poor film-forming property and the high mechanical strength of the layer.

SUMMARY OF THE INVENTION

The object of this invention is to provide a thermal recording element having protective layers of sufficient mechanical strength with limited or no reduction in recording sensitivity.

The above-mentioned object can be attained by forming on a recording layer a polymer layer which does not have a relatively high mechanical strength but exhibits less reduction in recording sensitivity and further forming on the polymer layer another polymer layer having high mechanical strength and excellent ability to protect the recording layer. That is, according to this invention, there is provided a thermal recording element comprising a support having formed directly or indirectly thereon a recording layer, a first protective layer comprising mainly a compound selected from a halogenated polyolefin, polystyrene, a polystyrene derivative, halogenated rubber and a styrene-vinyltoluene copolymer formed on the recording layer, and a second protective layer mainly comprising a polymer having high mechanical strength formed on the first protective layer.

BRIEF DESCRIPTION OF THE DRAWING

The FIGURE is a schematic cross-sectional view of an embodiment of the recording element of this invention.

DETAILED DESCRIPTION OF THE INVENTION

As the support used in this invention any of a wide variety of supports, generally used in this type of recording element may be used. For example, plastic films such as polyethylene terephthalate, polycarbonate, etc., glass sheets, papers, metallic sheets or foils, etc., may be used. Polyethylene terephthalate is particularly preferred.

The recording layer used in this invention is a layer having high optical density and is preferably composed of a material having a high covering power as a thin layer such as a metal. The recording layer used in this invention includes not only a layer composed of only a material having a high covering power as a thin layer (e.g., a metal layer) but also a recording layer unit composed of a metal layer and a layer composed of another material which increases the recording sensitivity superposed on the metal layer and a layer composed of a mixture of a metal and another material for increasing the recording sensitivity. The recording layer is the layer primarily responsible for the change in transmittance or light reflectance which occurs as a result of thermal deformation in the irradiated portions by the irradiation of laser light and one skilled in the art will recognize that various layer constructions and materials can be selected for the purpose.

As the metals used for the recording layer in this invention, there are Mg, Sc, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, As, Sb, Bi, Se, Te, etc., and they may be used alone or in combinations of two or more. Preferably the metal used in this invention is low or non-toxic, the energy required for fusing or evaporating the metal is low, and a film or layer of the metal can be easily formed. Sn, Bi and In are most preferred.

The recording layer can be formed in single layer or double layer on a support or a substrate or other layer on the support by various methods such as vacuum deposition, sputtering, ion plating, electroplating, electroless plating, etc., as a single layer or a combination or alloy of two or more metals. Furthermore, the metal may be applied as a layer wherein the metal and a material for increasing the sensitivity exist in a physically mixed state by means of co-deposition together with the other material.

The thickness of the metal layer should be capable of providing the necessary image density and is generally about 300 to 1,500 Å but depends upon the kind of metal used. Also, in the case of forming the metal layer on a support by vacuum deposition, sputtering, ion plating, etc., the layer structure of the metal layer differs with the kind of support, the temperature, the degree of vacuum, the speed of the vacuum deposition, etc., and hence the thickness of the metal layer necessary for obtaining a desired optical density depends on all these factors.

It is preferred that the metal is used together with a material for increasing the recording sensitivity as a mixture or as a laminate of layers. The material used in this case increases the recording sensitivity by preventing reflection or other action. As the materials used for the purpose, there are those which accelerate thermal deformation by preventing reflection such as oxides like PbO, $WO_3$, $TiO_2$, SiO, $SiO_2$, $ZrO_2$, etc.; chalcogen compounds such as the compounds of Ge, In, Sn, Cu, Ag, Fe, Bi, Al, Si, Zn, V, etc.; halides such as $PbX_2$, AgX, $SnX_2$, $SbX_5$, $SbX_3$, etc., (wherein X represents fluorine, chlorine, bromine, iodine, etc.); and As, Sb, P, Ge, Si, Te, etc. It is preferred that these materials have low toxicity, low hygroscopicity or deliquescence, or do not deteriorate with the passage of time by the dark reaction with the metal, and then can be formed into a layer or film easily. For the purposes, the use of GeS, SnS, $PbI_2$, etc., is particularly preferred. The thickness of these materials when coated depends upon the kind of metal used in the metal layer, the thickness of the metal layer, etc., but is usually about 50 to 1,000 Å.

The first protective layer used in this invention is mainly composed of a compound selected from a halogenated polyolefin, polystyrene, a polystyrene derivative, halogenated rubber, and a styrene-vinyltoluene copolymer and the layer is substantially composed of the compound alone or a combination of these compounds. Preferred examples of the halogenated polyolefin are polyolefins having a halogenation degree of 50 to 80% and a polymerization degree of about 100 to 10,000 such as chlorinated polyethylene, brominated, polyethylene, chlorinated polypropylene, and brominated polypropylene. Also, preferred polystyrene has a polymerization degree of about 50 to 1,000, and preferred examples of the polystyrene derivative are represented by polyhydroxystyrene, polyvinyltoluene, halogenated polystyrene, halogenated polyvinyltoluene, and halogenated polyhydroxystyrene.

Preferred examples of the halogenated rubber are halogenated natural rubber, halogenated polyisoprene, etc. Preferably the halogenated rubber has a halogenation degree of about 40 to 80%. The styrene-vinyltoluene copolymer preferably has a styrene to vinyltoluene molar ratio of about 1:9 to 9:1 and a molecular weight of about 3,000 to 6,000 and preferably a molecular weight up to 3,500.

Of the above polymers for the first protective layer the halogenated polyolefins described above are particularly preferred.

The above halogenated polymers may be prepared by halogenating either the corresponding monomer before polymerization or the corresponding polymer. Such halogenation may be performed utilizing an organic synthesis reaction such as chloromethylation and chlorosulfonation. The compounds constituting the first protective layer may be comparatively brittle and have not so good film-forming property. However, it is important that the compounds for the first protective layer have a comparatively low softening or decomposition point, preferably a softening or decomposition point below about 150° C. In the case of the halogenated polyolefins a preferred decomposition point is about 90° to 150° C. and in the case of the polystyrene derivatives a preferred softening point is about 70° to 120° C. A compound having a similar chemical composition to the above-mentioned compound is not always effective for the first protective layer of the thermal recording element of this invention. For example, chlorinated polyethylene is very similar to polyvinyl chloride or polyvinylidene chloride in chemical structure but when each of them is coated as the first protective layer having the same thickness, there is a remarkable difference between them in terms of their influence on the reduction in recording sensitivity. That is, when polyvinyl chloride or polyvinylidene chloride is used, the reduction in recording sensitivity is large and hence the use of these compounds is undesirable. The reason such a difference is observed is not clear but it is considered that the difference occurs by the difference in film-forming property, the difference in the extent of halogenation, or the difference in the chemical stability of halogen introduced.

There is no particular restriction about the coating method of the first protective layer. For example, a coating composition of the polymer dissolved or dispersed in an appropriate solvent is coated on the recording layer by a known coating means and dried. Suitable solvents include, for example, toluene, methyl ethyl ketone, methyl cellosolve, cyclohexane, acetone, benzene, chlorobenzene, 1,2-dichloroethane, 1,1,1-trichloroethane, methanol, ethanol, isopropanol, etc.

The thickness of the first protective layer depends upon the structure and the recording sensitivity of the recording layer and the nature and thickness of the second protective layer formed thereon but is generally about 0.1 $\mu$m to 10 $\mu$m and preferably about 0.15 $\mu$m to 5 $\mu$m.

The second protective layer used in this invention is mainly composed of a polymer having high mechanical strength as a layer, that is, a polymer having good film-forming property and capable of forming a strong film. The polymer having high mechanical strength as a film or layer can be defined as a polymer having a tensile strength higher than about 40 N/mm², preferably about 50 to 100 N/mm², measured by the method defined by ASTM-D 638. Examples of these polymers are described in *Polymer Handbook* (2nd Edition), Chapter VIII, pp. 2-3 (table) published by John Wiley and Sons Co. Practical examples are vinylic polymers such as polybutadiene, polyacrylic acid, polymethyacrylic acid, polyvinyl butyral, polyacrylonitrile, etc., polyester, polyurethane, polyamide, cellulose derivatives, ethyl cellulose, nylon, and copolymers containing these polymers as a component.

There are some restrictions on the coating of the second protective layer. Since the second protective layer is coated on the first protective layer formed on the recording layer, coating must be achieved without injuring the first protective layer. Practically speaking, the solvent used for coating the second protective layer must not be a solvent which dissolves the first protective layer or causes severe swelling of the first protective layer. Such a restriction differs according to the manner and conditions of coating, for example, in some cases, the same solvent as used for the first protective layer can be used for the second protective layer while changing the manner and conditions of coating.

The thickness of the second protective layer varies with the nature and the thickness of the first protective layer but is generally about 0.1 $\mu$m to 20 $\mu$m and preferably about 0.15 $\mu$m to 10 $\mu$m.

The main function of the protective layers is protection of the recording layer, that is, increase the mechanical strength of the recording element, but improvements in various other properties such as chemical resistance, heat resistance, humidity resistance, weather resistance, light fading resistance, storage stability, etc., are also advantages of the protective layers. By appropriately selecting the materials, additional advantages such that the surface of the recording element is slippery and the surface does not tend to form fingerprints in the case of handling the recording element during use, as well as prevention of materials from being evaporated and the layers from peeling upon recording are also important functions of the protective layers. As a matter of course, for increasing the protective faculty, the thickness of the protective layers may be increased but the increase in the thickness of the protective layers reduces greatly the recording sensitivity of the recording element and further reduces the resolving power and the quality of duplicates such as in the case of making duplicates with diazo films using the recording element as the original. Therefore, the thickness of the protective layers is determined strictly by the conditions under which the recording element is used.

The main function of the first protective layer is not so much increasing the so-called mechanical strength as a protective layer but is in that the first protective layer itself is softened or decomposed at a comparatively low temperature so that the thermal deformation of the recording layer is not hindered. On the other hand, the functions required on the second protective layer are mainly in the protection of the recording layer, that is, to increase the mechanical strength of the recording element but, as a matter of course, it also serves other purposes as required of the recording element such as to increase chemical resistance, to increase weather resistance, to increase light fading resistance, to increase preserving stability, to increase permanent preservative property of the recorded image, and to prevent stripping and peeling of the recorded portions upon recording.

As described above, the most important object of the protective layers is to increase the mechanical strength of the recording element but its other functions differ greatly depending on the physical form of the layers coated. For example, when the surface of the second protective layer is finely roughened by properly selecting the coating condition, not only is an increase in the apparent mechanical strength and abrasion resistance achieved but also there is improvement in the handling property such as slippery property obtained by reducing the contact area with other materials at the surface of the layer.

For improving the adhesion between the recording layer and the first protective layer or between the first protective layer and the second protective layer, an inter-layer having high affinity for both layers may be formed between the both layers or for improving the surface property and hygroscopicity, a third protective layer may be further formed on the second protective layer at a thickness of about 0.15 to 2 μm. Also, on the second or third protective layer of the polymer may be further formed a layer composed of a higher fatty acid, etc., for improving scratch hardness.

According to this invention, a thermal recording element having high mechanical strength can be prepared without reducing the recording sensitivity or with less reduction in recording sensititivy.

Also, when a reactivity organic compound is used as the first protective layer in this invention, the deterioration or damage of the recording layer by reaction with the first protective layer upon storage (in the light or in the dark) can be prevented or reduced by imparting the action of isolating oxygen, moisture, ultraviolet light, etc., to the second protective layer.

Then, the effect of this invention will be practically explained by the following examples.

EXAMPLE 1

On the surface of a polyethylene terephthalate film 100 μm thick In in a thickness of 350 Å and then GeS in a thickness of 200 Å were vacuum deposited under the condition of $5 \times 10^{-5}$ Torr to form a recording layer having a transmission density of 1.5 to 20 D.

As a polymer solution for the first protective layer, a solution of following Formulation I was prepared and coated on the recording layer using a rotary coater and dried to form the first protective layer of 0.15 μm dry thickness.

| Formulation I: | |
|---|---|
| Picotex C-100 (a vinyltoluene/styrene copolymer having molecular weight of about 1,000 and softening point of 100° C. made by Esso Research and Engineering Co.) | 1.5 g |
| Cyclohexane | 100 ml |

Then, a solution of following Formulation II was coated on the first protective layer under the same condition as the case of coating the solution of Formulation I to form a second protective layer.

| Formulation II: | |
|---|---|
| Amilan (nylon, made by Toray Co., Ltd.) | 4 g |
| Methanol | 50 ml |
| n-Butanol | 20 ml |
| Isopropyl Alcohol | 30 ml |

The FIGURE is a schematic sectional view showing an embodiment of the recording element of this invention comprising a support 10, a metal layer 11, a compound layer 12, a first protective layer 13, and a second protective layer 14.

A recording test was performed on the recording element thus obtained by scanning argon ion laser (wavelength of 5,145 Å, beam diameter of 25 μm) of maximum output of 2 watts at scanning speed of 19 meters/sec and various outputs. In this case, the minimum laser output at which a recording spot of 10 μm in diameter was obtained on the recording element was defined as the indicator comparing the sensitivity of recording elements.

The minimum output required for recording on the recording element obtained in this example was 200 m watts.

The surface strength of the recording element was measured using a sapphire R ball stylus (R=0.4 mm) by means of a surface strength tester, HEIDON-18, made by Shinto Kagaku K.K. While changing the load applied on the ball stylus, the state of forming scratch on the surface of the recording element was observed and the minimum load by which the recording layer was broken was defined as the indicator for the surface strength. The surface strength of the recording element obtained in this example was 40 g.

On the other hand, as a comparison sample of recording element, a recording element having the nylon protective layer of Formulation II only on the above-mentioned recording layer was prepared and the recording test and the surface strength test were perfomred under the same conditions as above. In this case, the minimum output required for recording was 225 m watts and the surface strength was 40 g.

That is, it is clear that by using Picotex as the first protective layer, the recording sensitivity could be increased without reducing the surface strength of the recording element.

EXAMPLE 2

A recording element having the same construction as in Example 1 was prepared using the solution of following Formulation III for the second protective layer in place of the solution of Formulation II used in Example 1 and the same tests as in Example 1 were practiced on the recording element.

| Formulation III: | |
|---|---|
| Styrene-Butadiene Copolymer (Priorite S-5D, made by Goodyear Tire & Rubber Co.) | 2 g |
| Toluene | 50 ml |
| Cyclohexane | 50 ml |

The minimum output required for recording was 225 m watts and the surface strength was 50 g.

On the other hand, a comparison recording element was prepared by coating the solution of Formulation III only on the recording layer without coating the solution for the first protective layer. In this case, the minimum output required for recording was 250 m watts and the surface strength was 50 g.

That is, by forming the first protective layer, the recording sensitivity could be increased without reducing the surface strength of the recording element.

EXAMPLE 3

A recording element having the same construction as in Example 1 was prepared using the solution of following Formulation IV in place of the solution of Formulation I as the first protective layer.

| Formulation IV: | |
|---|---|
| Polystyrene (Picolastic a-75, molecular weight of about 800, softening point of 75° C., made by Esso Research and Engineering Co.) | 1.5 g |
| Cyclohexane | 100 ml |

When the same tests as in Example 1 were carried out on the recording element, the minimum output required for recording was 200 m watts and the surface strength was 40 g. That is, the recording element had the same effect as that in Example 1.

EXAMPLE 4

A recording element having the same construction as in Example 2 was prepared using the solution of following Formulation V as the first protective layer in place of the solution of Formulation I for the first protective layer and the same tests as in Example 1 were practiced on the recording element thus prepared.

| Formulation V: | |
|---|---|
| Chlorinated Polyethylene (Super Kuron 907 LTA, molecular weight of 15,000, made by Sanyo Kokusaku Pulp K.K.) | 1 g |
| Toluene | 50 ml |
| Cyclohexane | 50 ml |

The minimum output required for recording was 225 m watts and the surface strength was 55 g. In this case, by forming the first protective layer, the recording sensitivity could be increased without reducing the surface strength.

EXAMPLE 5

A recording element having the same construction as in Example 2 was prepared using the solution of following Formulation VI as the first protective layer in place of the solution for the first protective layer in Example 2 and the same tests as in the example were practiced on the recording element.

| Formulation VI: | |
|---|---|
| Chlorinated Rubber CR-10 (made by Asahi Denka Kogyo K.K.) | 1 g |
| Methyl Ethyl Ketone | 50 ml |
| Methyl Cellosolve Acetate | 50 ml |

The minimum output required for recording was 200 m watts and the surface strength was 50 g. Thus, by forming the first protective layer, the recording sensitivity could be increased and the surface strength could be also increased as in Example 4.

Now, another effect of this invention, that is, the deterioration preventing effect by this invention, is explained by the following practical example.

EXAMPLE 6

Sample A prepared by coating the solution of Formulation V shown in Example 4 as the first protective layer and also sample B was prepared by further coating the solution of Formulation III shown in Example 2 as the second protective layer on the first protective layer. In the both samples, the recording layer had the same composition as in Example 1.

The both samples were disposed at the positions 30 cm apart from a high pressure mercury lamp (ultraviolet light source) of 200 watts with the recording layer side facing the lamp. That is, the ultraviolet light was not irradiated through the support. Then, the high pressure mercury lamp was lighted for a definite period of time to irradiate the both samples and the change of the transmission density was measured on the both samples. In this case, the transmission density was reduced by 0.5 in sample A but the transmission density was reduced by only 0.05 in sample B. Thus, it is clear that by the presence of the second protective layer, the deterioration of the recording layer by ultraviolet rays could be greatly improved.

While the invention has been described in detail and with reference to specific embodiments thereof, it will be apparent to one skilled in the art that various changes and modifications can be made therein without departing from the spirit and scope thereof.

What is claimed is:

1. A thermal recording element comprising a support having formed thereon directly or indirectly a recording layer, a first protective layer comprising a compound selected from a halogenated polyolefin, polystyrene, a polystyrene derivative, halogenated rubber, and a styrenevinyltoluene copolymer formed on the recording layer, and a second protective layer comprising a polymer having high surface strength formed on the first protective layer, wherein the thickness of the second protective layer is about 0.1 $\mu$m to 20 $\mu$m.

2. The thermal recording element of claim 1, wherein said support is polyethylene terephthalate.

3. The thermal recording element of claim 1, wherein said recording layer is a metal layer.

4. The thermal recording element of claim 1, wherein said recording layer is a layer of Sn, Bi or In.

5. The thermal recording element of claim 1, wherein said recording layer is a layer of GeS, SnS or PbI$_2$.

6. The thermal recording element of claim 1, wherein said recording layer is composed of a mixture of Sn, Bi or In and GeS, SnS or PbI$_2$ or composed of a layer of Sn, Bi or In and a layer of GeS, SnS or PbI$_2$.

7. The thermal recording element of claim 1, wherein the thickness of said recording layer is about 50 to 1,000 Å.

8. The thermal recording element of claim 1, wherein the thickness of the first protective layer is about 0.1 $\mu$m to 10 $\mu$m.

9. The thermal recording element of claim 1, wherein the thickness of the first protective layer is about 0.15 $\mu$m to 5 $\mu$m.

10. The thermal recording element of claim 1, wherein said polymer for the second protective layer has a tensile strength of higher than 40 N/mm$^2$ as measured in accordance with ASTM-D 638.

11. The thermal recording element of claim 1, wherein said polymer for the second protective layer is selected from polybutadiene, polyacrylic acid, polymethacrylic acid, polyvinyl butyral, polyacrylonitrile, polyester, polyurethane, polyamide, ethyl cellulose, nylon and the copolymers of them.

12. The thermal recording element of claim 1, wherein the thickness of the second protective layer is about 0.15 $\mu$m to 10 $\mu$m.

13. The thermal recording element of claim 1, wherein said first protective layer consists essentially of a compound selected from a halogenated polyolefin, polystyrene, a polystyrene derivative, halogenated rubber and a styrene-vinyltoluene copolymer, and said second protective layer consists essentially of a polymer having high surface strength.

14. The thermal recording element of claim 1, wherein said polystyrene derivative is selected from the group consisting of polyhydroxystyrene, polyvinyltoluene, halogenated polystyrene, halogenated polyvinyltoluene and halogenated polyhydroxystyrene.

* * * * *